United States Patent
Honda et al.

(10) Patent No.: US 8,480,962 B2
(45) Date of Patent: Jul. 9, 2013

(54) EXHAUST GAS PURIFICATION APPARATUS FOR ENGINE

(75) Inventors: Koutarou Honda, Ageo (JP); Norihiro Fujisawa, Ageo (JP)

(73) Assignee: Volvo Powertrain Aktiebolag, Gothenburg (SE)

( * ) Notice: Subject to any disclaimer, the term of this patent is extended or adjusted under 35 U.S.C. 154(b) by 0 days.

(21) Appl. No.: 13/486,426

(22) Filed: Jun. 1, 2012

(65) Prior Publication Data
US 2012/0237408 A1    Sep. 20, 2012

Related U.S. Application Data

(63) Continuation of application No. PCT/JP2010/063758, filed on Aug. 13, 2010.

(30) Foreign Application Priority Data

Dec. 4, 2009    (JP) .................................. 2009-276539

(51) Int. Cl.
*F01N 3/00*    (2006.01)
*F01N 3/10*    (2006.01)
*B01D 50/00*    (2006.01)

(52) U.S. Cl.
USPC ............................... 422/171; 60/274; 60/299

(58) Field of Classification Search
USPC .................... 422/172, 177, 180; 60/299, 300
See application file for complete search history.

(56) References Cited

U.S. PATENT DOCUMENTS

| 6,401,455 B1 | 6/2002 | Mathes et al. |
| 6,444,177 B1 * | 9/2002 | Muller et al. ................. 422/177 |

FOREIGN PATENT DOCUMENTS

| JP | 3283868 B2 | 3/2002 |
| JP | 2009-024654 A | 2/2009 |

* cited by examiner

*Primary Examiner* — Tom Duong
(74) *Attorney, Agent, or Firm* — Foley & Lardner LLP

(57) ABSTRACT

An engine exhaust gas purification apparatus for engine includes a mixing device for promoting mixing of a liquid reducing agent or a precursor thereof and exhaust gas is disposed at a position at which, when an engine is operating in a predetermined operating state, the liquid reducing agent or the precursor thereof injection-supplied from an injection nozzle impinges on substantially an entire surface of the mixing device. The predetermined operating state may be, for example, an operating state in which a solute tends to deposit from the liquid reducing agent or the precursor thereof. Thus, the liquid reducing agent or the precursor thereof adhering to the mixing device or an exhaust passage is reduced in absolute amount, thereby preventing that only a solvent evaporates from the liquid reducing agent or the precursor thereof adhering to the mixing device or the exhaust passage to deposit the solute.

2 Claims, 2 Drawing Sheets

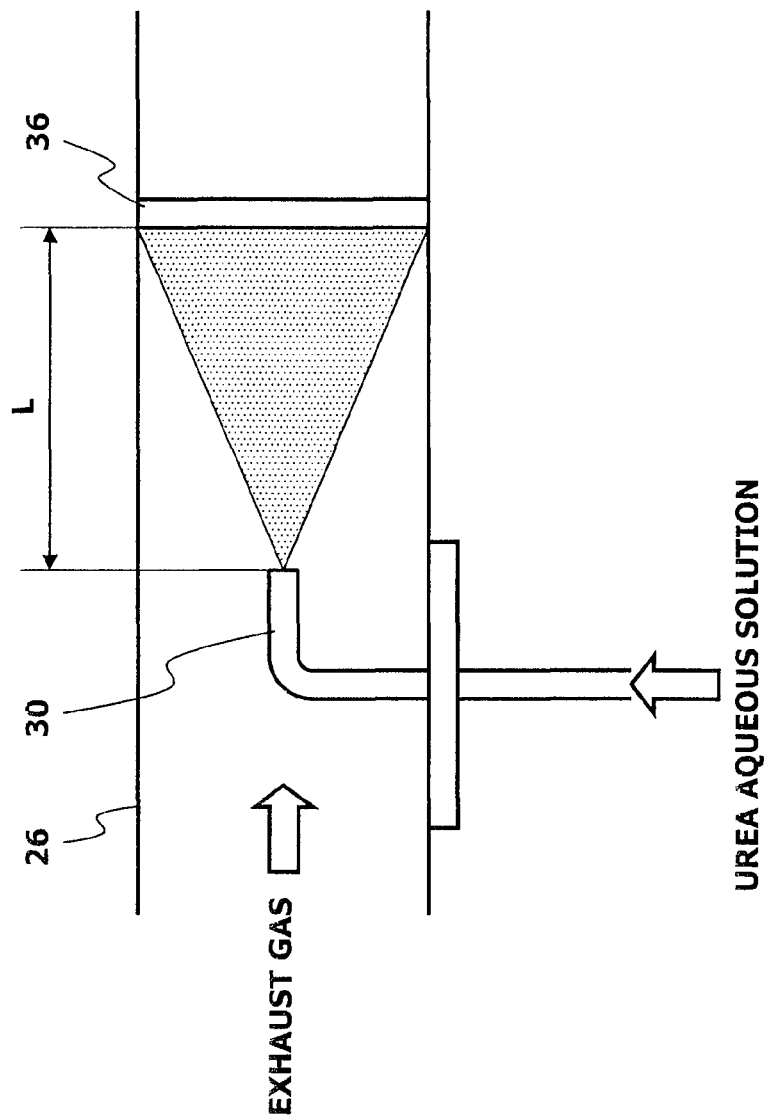

EXHAUST GAS PURIFICATION APPARATUS FOR ENGINE

This application is a continuation of PCT/JP2010/063758, filed on Aug. 13, 2010.

TECHNICAL FIELD

The present invention relates to an exhaust gas purification apparatus for purifying NOx (nitrogen oxides) contained in exhaust gas of an engine.

BACKGROUND ART

As an exhaust gas purification system for purifying NOx contained in engine exhaust gas, an exhaust gas purification apparatus described in Japanese Patent No. 3283868 (Patent Document 1) is proposed. The exhaust purification apparatus injection-supplies a liquid reducing agent or a precursor thereof at a flow rate according to an engine operating state, to an exhaust upstream side of an SCR (Selective Catalytic Reduction) catalyst disposed in an engine exhaust passage. The exhaust purification apparatus thus selectively causes a reduction reaction of NOx in the exhaust gas using the SCR catalyst, thereby purifying NOx to a harmless component. Moreover, in the conventional exhaust gas purification apparatus, to promote mixing of the liquid reducing agent or the precursor thereof injection-supplied from an injector including an injection nozzle and the exhaust gas, a mixing device (mixer) is disposed in the exhaust passage between the injection nozzle and the SCR catalyst.

CITATION LIST

Patent Document
   Patent Document 1: Japanese Patent No. 3283868

SUMMARY OF THE INVENTION

Problems to be Solved by the Invention

However, the conventional technique fails to take into consideration a state in which the liquid reducing agent or the precursor thereof injection-supplied from the injection nozzle impinges on the mixing device or the exhaust passage, and thus, there is a possibility that the following problem arises. In the case in which the liquid reducing agent or the precursor thereof injection-supplied from the injection nozzle locally impinges on the mixing device, the liquid reducing agent or the precursor thereof adheres to the mixing device in a droplet state, raising a possibility that only a solvent evaporates from the liquid reducing agent or the precursor thereof adhering to the mixing device to deposit a solute. Furthermore, in the case in which the liquid reducing agent or the precursor thereof injection-supplied from the injection nozzle spreads widely and impinges on not only the mixing device but also the exhaust passage, there is a possibility that only the solvent evaporates from the liquid reducing agent or the precursor thereof adhering to the exhaust passage to deposit the solute. For example, the deposits of the solute of the liquid reducing agent or the precursor thereof on the mixing device or the exhaust passage causes an increase in exhaust gas flow resistance, so that fuel efficiency and the like becomes lower.

In view of the problems of the conventional technique, the present invention has an object to provide an exhaust gas purification apparatus for engine that prevents solute deposits on a mixing device or an exhaust passage.

Means for Solving the Problems

In order to achieve the abovementioned object, an exhaust gas purification apparatus for engine includes: an SCR catalyst for selectively reducing and purifying NOx in exhaust gas using a reducing agent; an injection nozzle for injection-supplying a liquid reducing agent or a precursor thereof to an exhaust upstream side of the SCR catalyst; and a mixing device disposed in an exhaust passage between the injection nozzle and the SCR catalyst. The mixing device is disposed at a position at which, when an engine is operating in a predetermined operating state, the liquid reducing agent or the precursor thereof injection-supplied from the injection nozzle impinges on an entire surface of the mixing device.

ADVANTAGEOUS EFFECTS OF THE INVENTION

When the engine is operating in the predetermined operating state, the liquid reducing agent or the precursor thereof injection-supplied from the injection nozzle impinges on the entire surface of the mixing device. Accordingly, the liquid reducing agent or the precursor thereof is unlikely to adhere to the mixing device in a droplet state as compared with the case in which the liquid reducing agent or the precursor thereof locally impinges on the mixing device. Therefore, solute deposits can be prevented. Moreover, since the liquid reducing agent or the precursor thereof impinges on the entire surface of the mixing device, the liquid reducing agent or the precursor thereof adhering to the exhaust passage decreases in absolute amount. Therefore, it is prevent that only a solvent evaporates from the liquid reducing agent or the precursor thereof adhering to the exhaust passage to deposit a solute. Accordingly, by readjusting the positional relationship between the injection nozzle and the mixing device, the liquid reducing agent or the precursor thereof can be spread across the entire mixing device, so that mixing of the liquid reducing agent or the precursor thereof and the exhaust gas can be further promoted. In addition, solute deposits can be prevented while maintaining exhaust gas purification performance.

BRIEF DESCRIPTION OF THE DRAWINGS

FIG. 2 is a principal part longitudinal section view illustrating a position at which a mixing device is disposed.

DESCRIPTION OF EMBODIMENTS

Figure 1:
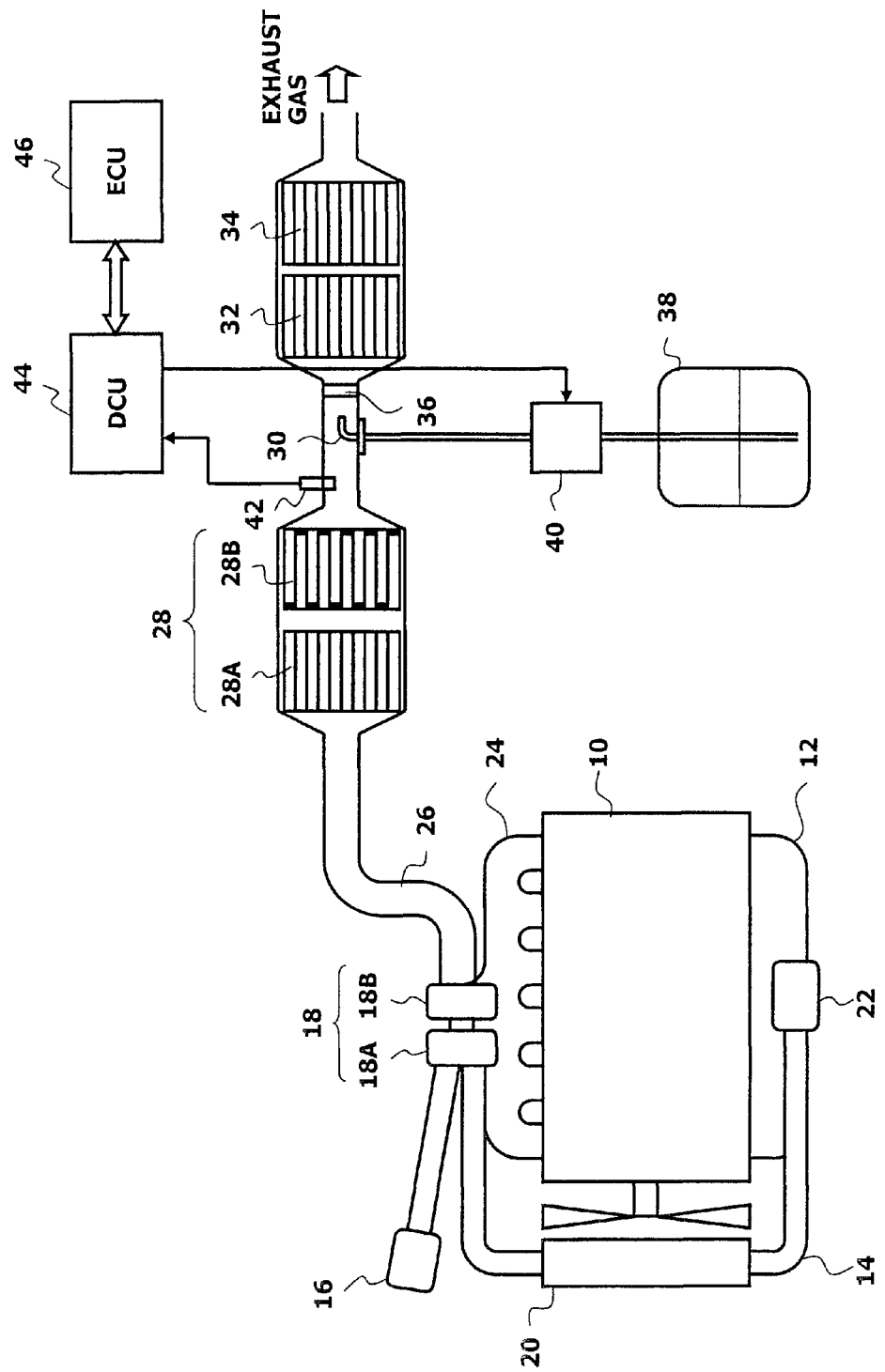
FIG. 1 is a schematic view illustrating an embodiment of an exhaust gas purification apparatus according to the present invention.

The following describes an aspect of the present invention in detail, with reference to attached drawings.

FIG. 1 illustrates an embodiment of an exhaust gas purification apparatus according to the present invention.

In an intake pipe 14 connected to an intake manifold 12 of a diesel engine 10, an air cleaner 16 for removing dust and the like in air, a compressor 18A of a turbocharger 18, an intercooler 20 for cooling intake air increased in temperature by the turbocharger 18, and an intake collector 22 for smoothing intake pulsation are arranged in this order along an intake flow direction.

On the other hand, in an exhaust pipe 26 (exhaust passage) connected to an exhaust manifold 24 of the diesel engine 10, a turbine 18B of the turbocharger 18, a continuous regeneration DPF (Diesel Particulate Filter) device 28, an injection nozzle 30 for injection-supplying a urea aqueous solution as a precursor of a reducing agent, an SCR catalyst 32 for selectively reducing and purifying NOx using ammonia generated from the urea aqueous solution, and an oxidation catalyst 34 for oxidizing ammonia having passed through the SCR catalyst 32 are arranged in this order along an exhaust flow direction. The continuous regeneration DPF device 28 includes a DOC (Diesel Oxidation Catalyst) 28A for at least oxidizing NO (nitrogen monoxide) to $NO_2$ (nitrogen dioxide), and a DPF 28B for collecting and removing PM (Particulate Matter). Here, instead of the DPF 28B, a CSF (Catalyzed Soot Filter) supporting a catalyst (active component and additional component) on its surface may be used.

Moreover, a mixing device 36 for promoting mixing of the urea aqueous solution injection-supplied from the injection nozzle 30 and the exhaust gas is disposed in the exhaust pipe 26 between the injection nozzle 30 and the SCR catalyst 32. The mixing device 36 is also referred to as "mixer" and, for example, induces swirling flow of the fluid passing through it. A well-known mixing device such as a structure in which a swirler rises from a plate-shaped substrate, a structure in which a large number of holes are formed in a plate-shaped substrate, or the like may be used as the mixing device 36.

As illustrated in FIG. 2, the mixing device 36 is disposed at a position away from the injection nozzle 30 toward an exhaust downstream side by a predetermined distance L so that, when the diesel engine 10 is operating in a predetermined operating state, the urea aqueous solution injection-supplied from the injection nozzle 30 impinges on substantially an entire surface of the mixing device 36. The predetermined operating state mentioned here is an operating state when driving in a city or the like where urea tends to deposit from the urea aqueous solution (e.g. the first part of JE05 mode assuming heavy vehicles), that is, an operating state in which an exhaust temperature is near a predetermined temperature at which the injection-supply of the urea aqueous solution starts. The predetermined distance L may be appropriately determined by examining how the urea aqueous solution impinges on the mixing device 36 when the diesel engine 10 is operating in the predetermined operating state.

The urea aqueous solution stored in a reducing agent tank 38 is supplied to the injection nozzle 30 via a reducing agent dosing unit 40 that includes a pump and a flow control valve. The reducing agent dosing unit 40 may have a structure of being divided into two modules that are a pump module including the pump and a dosing module including the flow control valve.

To the exhaust pipe 26 between the continuous regeneration DPF device 28 and the injection nozzle 30, a temperature sensor 42 for measuring the temperature of the exhaust (exhaust temperature) is attached. An output signal of the temperature sensor 42 is input to a reducing agent dosing control unit (DCU: Dosing Control Unit) 44 that includes a computer. The DCU 44 is connected, via an in-vehicle network such as a CAN (Controller Area Network), to an ECU (Engine Control Unit) 46 for electronically controlling the diesel engine 10, so as to be able to read a rotation speed and a load as an engine operating state at an arbitrary point in time. By executing a control program stored in a ROM (Read Only Memory) or the like, the DCU 44 electronically controls the reducing agent dosing unit 40 according to the exhaust temperature, the rotation speed, and the load.

As the load of the diesel engine 10, a state quantity closely related to a torque, such as a fuel injection amount, an intake flow rate, an intake pressure, a supercharging pressure, an accelerator operation amount, and the like, may be used as an example. The rotation speed and the load of the diesel engine 10 may be directly detected using well-known sensors, instead of being read from the ECU 46.

In such an exhaust gas purification apparatus, the exhaust gas of the diesel engine 10 is introduced into the DOC 28A of the continuous regeneration DPF device 28 via the exhaust manifold 24 and the turbine 18B of the turbocharger 18. The exhaust gas introduced into the DOC 28A flows to the DPF 28B while NO in the exhaust gas is oxidized to $NO_2$. In the DPF 28B, PM in the exhaust gas is collected, and oxidized (burned) using $NO_2$ generated by the DOC 28A.

The urea aqueous solution injection-supplied (dosed) from the injection nozzle 30 according to the engine operating state is hydrolyzed using exhaust heat and a water vapor in the exhaust gas while the mixing device 36 promotes mixing of the urea aqueous solution and the exhaust gas, and converted to ammonia that functions as the reducing agent. This ammonia selectively reduction reacts with NOx in the exhaust gas in the SCR catalyst 32, as a result of which NOx is purified to harmless $H_2O$ (water) and $N_2$ (nitrogen), as is known. Here, NO is oxidized to $NO_2$ by the DOC 28A to improve a ratio between NO and $NO_2$ in the exhaust gas to a ratio suitable for a selective reduction reaction, so that a NOx purification rate in the SCR catalyst 32 can be enhanced. Meanwhile, ammonia having passed through the SCR catalyst 32 is oxidized by the oxidation catalyst 34 disposed at an exhaust downstream side of the SCR catalyst 32, and therefore can be kept from being emitted directly into the atmosphere.

When the diesel engine 10 is operating in the predetermined operating state, that is, in a state in which urea as a solute tends to deposit due to evaporation of a solvent from the urea aqueous solution, the urea aqueous solution injection-supplied from the injection nozzle 30 impinges on substantially the entire surface of the mixing device 36. Accordingly, the urea aqueous solution is unlikely to adhere to the mixing device 36 in a droplet state as compared with the case in which the urea aqueous solution locally impinges on the mixing device 36. Therefore, urea as the solute deposits can be prevented. Moreover, since the urea aqueous solution impinges on substantially the entire surface of the mixing device 36, the urea aqueous solution adhering to the inner wall of the exhaust pipe 26 decreases in absolute amount. Therefore, it is prevented that only the solvent evaporates from the urea aqueous solution adhering to the inner wall of the exhaust pipe 26 and urea as the solute deposits.

Thus, by readjusting the positional relationship between the injection nozzle 30 and the mixing device 36, the urea aqueous solution can be spread (supplied) across the entire mixing device 36, so that mixing of the urea aqueous solution and the exhaust gas can be further promoted. In addition, solute deposits can be prevented while maintaining exhaust gas purification performance.

Note that the present invention is applicable not only to an exhaust gas purification apparatus that uses a urea aqueous solution as a liquid reducing agent or a precursor thereof, but also to an exhaust gas purification apparatus that uses alcohol, light diesel oil, or the like having a hydrocarbon as a main component.

It should be noted that the entire contents of Japanese Patent Application No. 2009-276539, filed on Dec. 4, 2009, on which the convention priority is claimed is incorporated herein by reference.

It should also be understood that many modifications and variations of the described embodiments of the invention will occur to a person having an ordinary skill in the art without departing from the spirit and scope of the present invention as claimed in the appended claims.

The invention claimed is:

1. An exhaust gas purification apparatus for an engine comprising:
    an SCR catalyst for selectively reducing and purifying nitrogen oxides in exhaust gas using a reducing agent;
    an injection nozzle for injection-supplying a liquid reducing agent or a precursor thereof to an exhaust upstream side of the SCR catalyst; and
    a mixing device disposed in an exhaust passage between the injection nozzle and the SCR catalyst,
    wherein the mixing device is disposed at a pre-set position which is away from the injection nozzle toward an exhaust downstream side by a predetermined distance so that the liquid reducing agent or the precursor thereof injection-supplied from the injection nozzle impinges on an entire surface of the mixing device in an engine operating state in which an exhaust temperature at which the injection-supply of the liquid reducing agent or the precursor thereof from the injection nozzle is started is near a predetermined temperature.

2. The exhaust gas purification apparatus for an engine according to claim 1, wherein the liquid reducing agent or the precursor thereof is a urea aqueous solution.

* * * * *